Inventor
J. Hartzler Redhead
By Richey & Watts
Attorneys

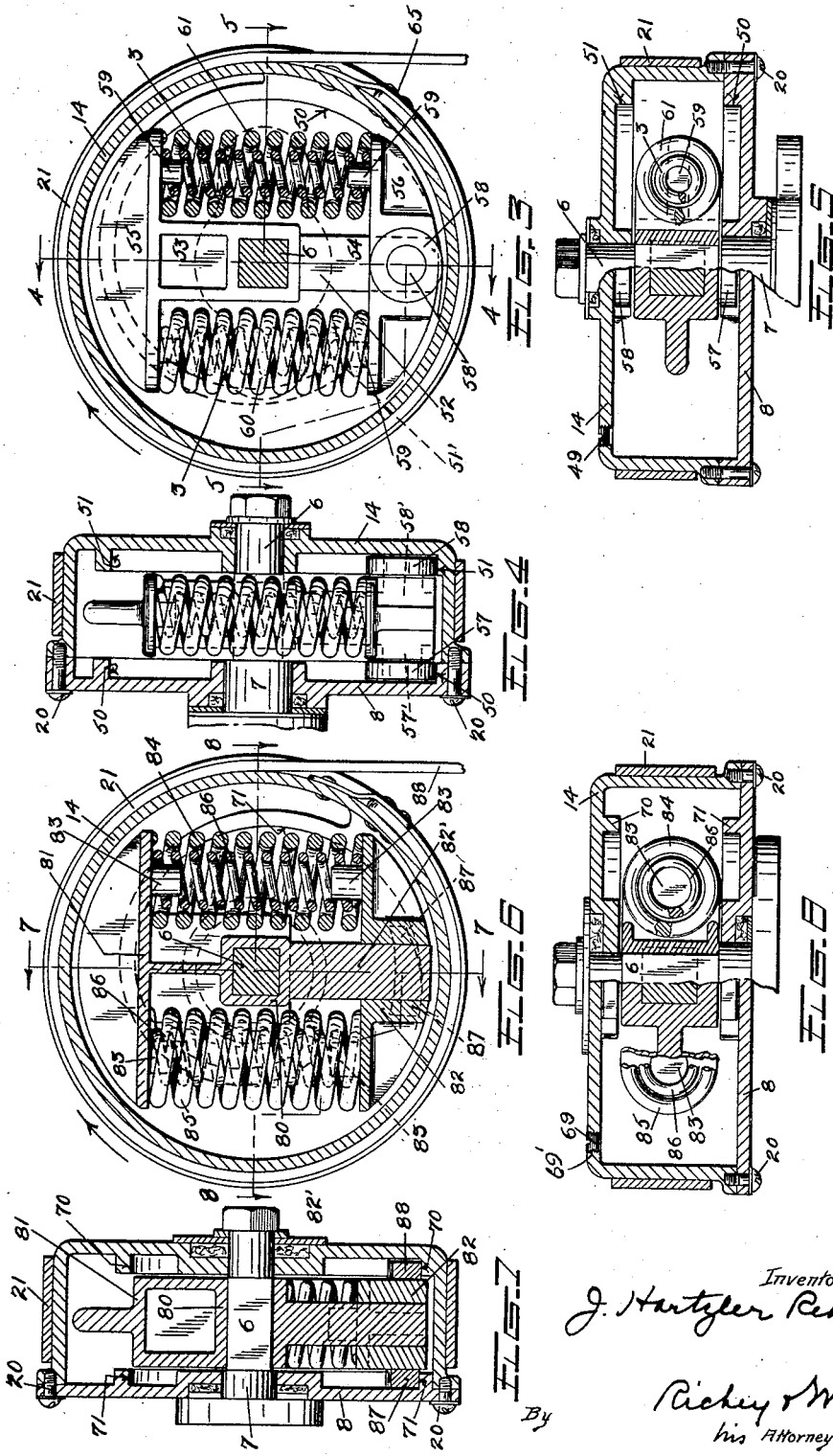

Patented Sept. 13, 1932

1,877,588

UNITED STATES PATENT OFFICE

JACOB HARTZLER REDHEAD, OF CLEVELAND, OHIO

SHOCK ABSORBER

Application filed January 1, 1929. Serial No. 329,680.

My invention is an improvement in shock absorbers and relates more particularly to that type of shock absorber generally known as a snubber.

One of the objects of my invention is to construct an antifriction snubber or rebound controller for vehicles.

Another object of my invention is to quickly and easily dissipate rebound shock between relatively movable members, certain of said members being under a compressive stress and in antifrictional engagement with certain other of said members.

Another object of my invention is to quickly and easily dissipate the rebound shock between relatively movable members by subjecting the shock to an opposing compressive force.

Other objects and advantages of my invention will become apparent as the descriptions of several embodiments of the invention progress, reference being made to the accompanying drawings forming a part of this specification and in which like reference characters are employed to designate parts throughout the same.

Fig. 3 is an elevation of a second embodiment of my invention, showing some of the parts in section.

Fig. 4 is a vertical central section through the casing, as shown in Fig. 3, showing the elements within the casing in elevation.

Fig. 5 is a section taken on line 5—5 of Fig. 3.

Fig. 6 is an elevation of a third embodiment of my invention, showing some of the parts in section.

Fig. 7 is a vertical central section on line 7—7 of Fig. 6 showing some of the parts in elevation.

Fig. 8 is a horizontal section on line 8—8 of Fig 6.

In carrying out my invention I provide means for antifrictionally and progressively dissipating shock as, for instance, between the chassis and running gear of a vehicle, together with suitable means for supporting the shock absorbing means.

Figure 1:
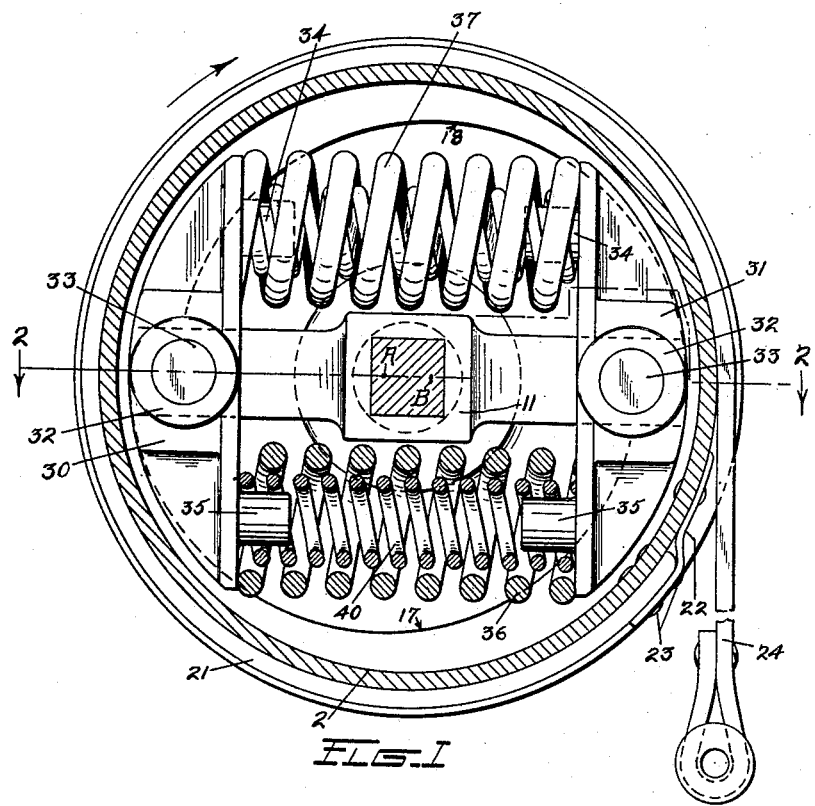
Fig. 1 is a side elevation of one embodiment of my invention partly in section.
Figure 2:
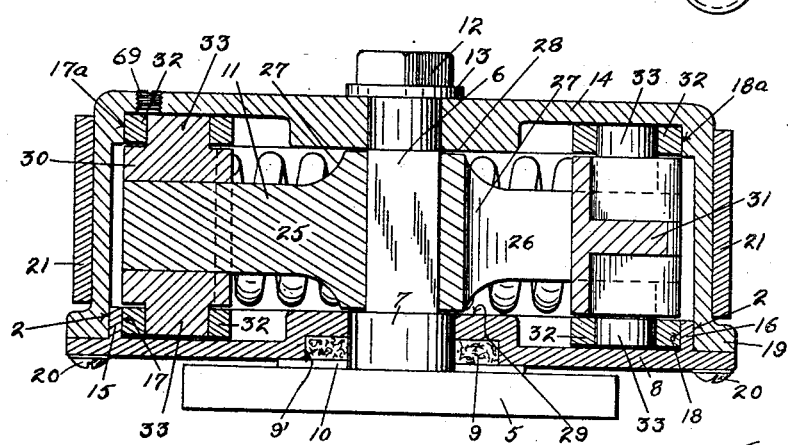
Fig. 2 is a section taken on line 2—2 of Fig 1, showing some of the parts in elevation.

As shown in Figs. 1 and 2 which are illustrative of one embodiment of my invention the snubber securing means may include an attaching or securing plate 5, the plate being secured in place by bolts or welding. I have also provided means for rotatably supporting the snubber from the plate 5 which includes a spindle or shaft 6 extending outwardly axially therefrom. An annular shoulder 7 is formed on the end of the spindle adjacent the securing plate 5 to provide a bearing surface for the back plate 8. A packing 9 of suitable material is carried within annular recess 9' formed in the plate 8 and abuts against the shoulder 7 and the raised portion 10 formed on the plate 5. The main body of the spindle 6 is preferably polygonal in cross section as shown in Fig. 1, to present relative rotational movement between the spindle and a spider or frame member 11 when the latter is mounted upon the spindle. A nut 12 and a washer 13 are fitted on the free end of the spindle after a casing or drum has been assembled thereon, permitting rotational movement of the drum but preventing axial movement of the drum upon the spindle. I also provide means for housing and actuating the shock dissipating means. In Figs. 1 and 2, I have illustrated a drum 14 which together with the plate 8 forms a casing and is rotatably mounted upon the spindle 6, the spindle passing through aligned openings in the plate and drum as shown, so that they may rotate as a unit when secured together. Flanges 15 and 16 are formed on the plate 8 adjacent the outer periphery thereof and extend inwardly within the drum. The outer walls 2 of the respective flanges 15 and 16 are preferably continuous and are formed about the longitudinal axis of the spindle as their true center. These outer walls 2 form with the plate 8 an annular seat for the drum 14. The respective inner walls of the flanges 15 and 16 form tracks or cam-like roller engaging surfaces which are designated at 17 and 18 respectively. These cam-like surfaces extend preferably from points diametrically opposite and define arcuate paths formed about centers A and B, respectively. The center about which the surface 17 is formed is designated at A1, Fig. 1, and the center about which the surface 18 is formed is designated at B, of the same figure. Similarly arranged cam-like roller engaging surfaces or tracks 17a and 18a are formed upon the inner walls of the drum 14, the respective points along the respective tracks 17 and 17a and tracks 18 and 18a being in alignment. It is to be understood that I may employ only a single pair of similarly arranged cam-like roller engaging surfaces, one of which is formed upon the plate and the other upon the inner drum wall, or I may employ a series of such surfaces formed upon the plate and upon the inner drum wall, respectively, the respective points in each series being in alignment.

The drum or casing member 14 preferably consists of an annular cup-shaped cover, the central opening therein being in alignment with the opening in the plate 8 for assembly upon the spindle 6. The outer annular edge of the cover 14 is flanged outwardly as at 19, and seats against the plate and the outer surfaces of the flanges 15 and 16, forming a tightly sealed joint between the two members to prevent leakage of lubricant carried within the drum. Suitable bolts or the like 20 securely hold the cover 14 and plate 8 together for rotation about the spindle 6.

A strap 21 of suitable flexible material such as leather, fabric, or composition material is secured at one end to the outer periphery of the drum 14 by a clamp 22 and rivets 23, the clamp being bent upwardly and forwardly at one end to overlap the end of the strap, while the other end of the clamp is riveted to the drum from its attached end, its free end 24 being connected to the axle or any other suitable part of the running gear of the vehicle.

When the vehicle encounters a rut or other uneven road surface when the relative movement between the chassis and running gear of the vehicle is such that the chassis and running gear move toward each other, the strap 21 will assume the position shown in Fig. 1. On the rebound, or when the relative movement between the chassis and the axle or running gear of the vehicle is such that the chassis and running gear move away from each other, strap 21 will be caused to unwind from the cover or drum 14, rotating the drum upon the spindle 6 in a clockwise direction as shown by the arrow in Fig. 1.

A spider or frame member 11 having a plurality of radially extending arms 25 and 26 disposed preferably diametrically opposite each other, is mounted upon the spindle, there being an opening through the spider of substantially the same shape as the polygonal cross section of the spindle 6 to prevent relative rotational movement between the spindle and the spider. Although I have shown the arms 25 and 26 as extending diametrically opposite each other, it is to be understood that I may employ a spider or frame member having a greater or lesser number of radially extending arms regardless of whether or not they are arranged diametrically. The portion of the spider adjacent the central opening therethrough is reinforced as at 27, the opposite end walls each are adapted to engage the inwardly disposed bearing surfaces 28 and 29 of the drum 14 and the plate 8, respectively, to prevent axial movement of the spider upon the spindle 6.

The arms 25 and 26 are adapted to receive spring supports 30 and 31, respectively, which when assembled provide an adjustable frame. Each of these spring supports is apertured and is capable of radial movement upon the respective arms, as shown in the drawings. In the present embodiment, suitable rollers 32 are mounted on opposite sides of each of the spring supports and are rotatably supported by studs or axles 33 formed preferably integrally with the supports 30 and 31. It will be noted that the rollers 32 engage and travel over the respective tracks 17, 18, 17a and 18a when the drum is rotated. Each of the spring supports is substantially segmental in general appearance as shown in Fig. 1, the chords of the respective segments defining substantially flat compression spring engaging and supporting surfaces, while the arced portions of the respective segments are substantially concentric with the true axis of the drum and are spaced from the inner drum surfaces at all points, to permit rotation of the drum without frictional contact with the supports. The flat surfaces of the respective spring supports lie in substantially parallel planes when the parts are in normal position or that shown in Fig. 1. Spring retaining studs 34 and 35 are formed on opposite ends of the respective flat spring supporting surfaces and project toward each other, the respective studs 34 and the respective studs 35 being in substantial axial alignment when the parts are in the position shown in Fig. 1.

I have provided means for exerting a compressive force against the opposing supports 30 and 31 tending to thrust them in opposite directions toward the circumferential wall of the drum. This means may include suitable compression devices such as coiled compression springs 36 and 37, the opposite ends of the spring 36 being seated over the respective studs 35 and the opposite ends of the spring being seated over the respective studs 34. I have illustrated the use of coiled compression springs, but it is to be understood that the present invention contemplates the use of any other suitable means of producing a compressive force or forces to normally force the supports 30 and 31 in opposite directions toward the circumferential wall of the drum 14. It will be seen that the forces exerted against the supports 30 and 31 are transmitted through these respective supports and the rollers 32 and thence to the respective cam-like roller engaging surfaces 17, 18, 17a and 18a, maintaining the rollers in contact with the respective roller engaging surfaces or tracks. I may provide auxiliary springs 40 arranged preferably within the springs 36 and 37, their respective ends being seated upon the opposite respective studs 34 and 35 as shown in Fig. 1. In this manner, I increase the effective compressive force exerted through the rollers, whereby I am enabled to produce a snubber capable of dissipating unusual shocks in a very effective and smooth manner.

Although I have shown and described means for increasing the effective compressive force applied through the rollers, it is to be understood that I may eliminate the auxiliary springs 40 and utilize only the springs 36 and 37 as a source of compressive force.

The operation of the embodiment shown in Figs. 1 and 2 is as follows:

When the vehicle encounters an uneven road surface, such as a rut, the chassis and the vehicle running gear will be caused to move toward each other. Upon the rebound, or when the chassis and running gear move away from each other, the strap 21 will be caused to unwind itself from the drum, rotating the drum in the direction of the arrow in Fig. 1. When the drum is thus rotated the cam-like roller-engaging surfaces 17, 18 and 17' and 18' move under the respective rollers 32. As the rotation of the drum progresses and the cam surfaces move under the rollers, the spring supports 30 and 31 are forced inwardly along the arms 25 and 26 toward the axis of the drum and against the compression of the springs 36, 37 and 40. It will be noted that the rollers are in substantially anti-frictional contact with the tracks 17, 18, 17a and 18a due to the restricted contact between the roller and the respective tracks, and to the fact that the contracting surfaces are well lubricated at all times.

In Figs. 3, 4 and 5, I have illustrated a second embodiment of my invention, which is similar in some respects to that embodiment illustrated in Figs. 1 and 2, but which embodies certain modifications of construction which will be noted herein below.

In Figs. 3, 4 and 5, plate 8 is rotatably mounted upon a bearing 7 formed on the spindle 6. A drum or cover 14 is likewise rotatably mounted on a bearing formed on the outer end of the spindle 6, the drum being secured to the plate 8 by a series of bolts, or the like 20 to rotate as a unit about the spindle 6. Suitable lubricant may be introduced into the drum by removing the plug 49. Roller engaging tracks 50 and 51 are formed on the opposite inner walls of the plate 8 and drum 14 respectively, and extend inwardly within the drum in substantial alignment with each other, the roller engaging surfaces of the tracks being substantially spirally arranged as shown in Fig. 3, and extending inwardly from the inner walls of the drum and plate, respectively. The inner ends of the tracks thus formed terminate in a seat or stop 51' to limit the rotation of the drum in one direction, the rollers 57 and 58 being adapted to engage the respective stops and limit the rotation of the drum in one direction.

A spring supporting frame or spider 52 is rigidly mounted upon the spindle 6 and comprises oppositely disposed radial arms 53 and 54, the arm 53 being rigidly formed on the spider body and terminating in a rigid spring supporting platform 55. The platform 55 is substantially arcuate along its outer edge and is provided with a substantially flat spring supporting surface along another edge. A similar platform 56 is slidably mounted upon the arm 54 of the spider or frame and is provided with rollers 57 and 58 supported on opposite sides of the platform upon studs 57' and 58' respectively in such a manner that they will rotatably engage the respective spirally arranged tracks 50 and 51 formed upon the drum and plate. These platforms or supports together with the spider form a frame like structure. Each of the platforms 55 and 56 is provided with oppositely and inwardly projecting studs 59 over which the ends of the coiled compression springs 60 and 61 are seated. Auxiliary springs 3 are arranged coaxially of and preferably within the springs 60 and 61 and are likewise seated upon opposite studs 59. The springs 3 may be omitted if desired. It will be seen that the springs 60 and 61 normally exert their compression against the platforms 55 and 56 and force the platform 56 toward the periphery of the drum 14, so that the rollers 57 and 58 antifrictionally engage the respective tracks 50 and 51 under compression of the springs.

In this embodiment of my invention, I have provided a set of rollers movable along a continuously curved track formed within the drum, the track describing an arc of more than 180°. It will be noted also that in this embodiment of my invention, I have provided but one movable spring platform, the other spring platform being fixed to the spider. A suitable flexible strap 21 preferably constructed of leather or strong fabric or composition material is secured at one end to the outer periphery of the drum as at 65 and is wound about the drum periphery, its free end being secured to the vehicle axle or running gear.

In operation, after the vehicle encounters a rut or the like, and the parts are in the position shown in Fig. 3, the rebound movement begins, whereupon the chassis and running gear are caused to move away from each other unwinding the strap from the drum and causing the spirally arranged tracks 50 and 51 to pass under the rollers 57 and 58. As the drum rotates in a clockwise direction as in Fig. 3 and as the tracks 50 and 51 pass under the rollers, the rollers together with the platform 56 will be caused to move inwardly toward the spindle 6 along the arm 54, compressing the springs 60, 61 and 3. As the strap unwinds and the drum continues to revolve the compression of the springs will become increased to such an extent that the rebound shock will be gradually dissipated. After the rebound shock has been dissipated, the drum will be permitted to rotate in the opposite direction to rewind the strap, whereupon the platform 56 will be permitted to move toward the periphery of the drum under the compression of the springs. It will be observed that the springs act to maintain the rollers in contact with the tracks under considerable compression and that this compression increases gradually as the drum is rotated in one direction and decreases gradually as the drum is rotated in the opposite direction, thereby insuring a gradual and effective dissipation of the rebound shock.

Referring now more particularly to Figs. 6, 7 and 8 which are illustrative of a third embodiment of my invention, it will be seen that I have provided a snubber somewhat similar to the foregoing embodiments but which differs in certain respects which will be hereinafter disclosed.

In the embodiment of my invention, shown in Figs. 6, 7 and 8, a cover forming a housing 14, and a plate 8 similar in construction to those shown in the other figures, are secured together in any suitable manner, such as by bolts, or the like 20. Lubricant may be injected into the interior of the drum through the opening 69, a plug 69 is inserted into the opening to prevent accidental removal of the lubricant. The drum and plate are rotatable about the spindle 6 as a unit, and are provided on their inner walls with spirally arranged tracks 70 and 71 respectively. These tracks are preferably in the form of flanges formed integrally with the inner walls of the drum and plate, respectively, and project inwardly of the drum and plate toward each other. The tracks preferably define spiral arcs of more than 180° and are somewhat similar in shape to the tracks 50 and 51 shown in the embodiment illustrated in Figs. 3, 4 and 5.

A spring supporting frame 80, comprising a fixed platform 81, and a slidable platform 82 movable along an arm 82', is apertured for assembly upon the spindle 6. Suitable stubs 83 are formed on the opposite ends of the platforms 81 and 82, the opposite studs on the respective platforms being in substantial alignment with each other. Coiled compression springs 84 and 85 are supported between the respective opposite ends of the platforms, the open ends of the springs being seated over the respective studs. Auxiliary springs 86, coextensive of and preferably within the springs 84 and 85, are also seated over the respective opposite studs 83.

Shoes 87 and 88 may be fixed to or formed integrally with the platform 81 on opposite sides thereof to engage the tracks 70 and 71 under compression of the springs. The under or track engaging surfaces of the shoes are curved inwardly toward one end as toward the right in Fig. 6, so that as the drum is rotated in a clockwise direction in this figure and the spiral tracks advance under the shoes, the points of contact between the shoes and the tracks will advance toward the ends 87' of the respective shoes, due to the shortening of the radius of the tracks at the points at which they engage the shoes.

In operation, upon the rotation of the drum in a clockwise direction in Fig. 6 as when the chassis and running gear are caused to move away from each other, the tracks 70 and 71 will be caused to pass under the respective shoes 88 and 87. The shoes are normally in contact with the respective tracks under compression of the springs and as the drum is rotated, as indicated, the compression of the springs will be materially increased since the platform 82 travels inwardly along the arm 82'. As the drum approaches its limit of rotation in this direction the springs will become compressed to a higher degree until the rebound shock shall have been entirely dissipated. The compression of the springs will now tend to return the parts to normal position.

I claim:

1. In a rebound snubber, a casing, helical tracks formed within said casing, a shaft, means to rotate said casing about said shaft, a frame carried by said shaft, means carried by said frame for anti-frictionally engaging said tracks, and a compression device carried by said frame for normally exerting a compressive force against said engaging means.

2. In a rebound snubber, a casing, helical tracks formed within said casing, a shaft means to rotate said casing about said shaft, a frame carried by said shaft, means carried by said frame for anti-frictionally engaging said tracks, and a plurality of compression springs carried by said frame for normally exerting a compressive force against said engaging means.

3. In a snubber, a casing, helical tracks formed upon the inner walls thereof, a shaft, means to rotate said casing about said shaft, a frame carried by said shaft, track engaging means on the frame, supports movable on said frame, said track engaging means carried by one of said supports, means for causing said track engaging means to anti-frictionally engage said tracks and resilient means resisting the movement of said supports.

4. In a snubber, a casing, tracks formed upon the inner walls thereof, said tracks being spirally arranged, a shaft through the casing, means to rock said casing about the shaft, and a frame within the casing and secured to said shaft, supports movable upon said frame radially of said casing, rollers on said supports for anti-frictionally engaging said spirally arranged tracks and resilient means resisting the movement of said supports.

5. In a snubber, a casing, tracks formed upon the inner walls thereof, said tracks being spirally arranged, a shaft through the casing, means to rotate said casing about the shaft, and a frame within the casing and secured to said shaft, supports movable upon said frame radially of said casing, track engaging means on said supports for anti-frictionally engaging said spirally arranged tracks and resilient means resisting the movement of said supports.

6. In a snubber, a casing, tracks formed upon the inner walls thereof, said tracks being spirally arranged, a shaft through the casing, means to rotate said casing about the shaft, and a frame within the casing and secured to said shaft, supports movable upon said frame radially of said casing, shoes on said supports for anti-frictionally engaging said spirally arranged tracks and resilient means resisting the movement of said supports.

7. In a snubber, a casing having a cylindrical side wall and an end wall, a shaft projecting into said casing and carrying an arm extending radially toward said cylindrical wall, said casing and said shaft being mounted for relative rotation, a supporting member slidably mounted on said arm and projecting laterally toward said end wall, a cam track on said end wall, means on said supporting member engaging said track, and resilient means normally urging said supporting member outwardly along said arm to resist relative rotation of said casing and shaft in one direction.

8. In a snubber, a casing, tracks formed upon the inner walls thereof, said tracks being spirally arranged, a shaft through the casing, means to rock said casing about the shaft, means within the casing for anti-frictionally engaging said tracks, and resilient means resisting the movement of said last named means.

In testimony whereof I hereunto affix my signature this 29th day of December, 1928.

JACOB HERTZLER REDHEAD.